United States Patent
Ross

(10) Patent No.: US 8,646,518 B2
(45) Date of Patent: Feb. 11, 2014

(54) RADIANT HEATING ASSEMBLY

(76) Inventor: Paul C. Ross, Northampton, MA (US)

( * ) Notice: Subject to any disclaimer, the term of this patent is extended or adjusted under 35 U.S.C. 154(b) by 729 days.

(21) Appl. No.: 12/883,360

(22) Filed: Sep. 16, 2010

(65) Prior Publication Data

US 2011/0052160 A1 Mar. 3, 2011

Related U.S. Application Data

(63) Continuation-in-part of application No. 11/291,708, filed on Dec. 1, 2005, now abandoned.

(60) Provisional application No. 60/687,701, filed on Jun. 6, 2005.

(51) Int. Cl.
*F24H 9/06* (2006.01)

(52) U.S. Cl.
USPC .............................. 165/171; 165/49; 165/55

(58) Field of Classification Search
USPC ......... 165/49, 55, 56, 67, 168, 169, 171, 172, 165/178; 248/62, 74.2
See application file for complete search history.

(56) References Cited

U.S. PATENT DOCUMENTS

| | | |
|---|---|---|
| 3,228,640 A | 1/1966 | Wolsh |
| 4,121,653 A | 10/1978 | Vinz |
| 5,454,428 A | 10/1995 | Pickard et al. |
| 5,743,330 A | 4/1998 | Bilotta et al. |
| 5,871,306 A | 2/1999 | Tilcox |
| 5,949,020 A | 9/1999 | Mitchell et al. |
| 6,073,891 A | 6/2000 | Humber |
| 6,598,836 B1 | 7/2003 | Leon |
| 6,910,526 B1 | 6/2005 | Sokolean |
| 7,021,372 B2 | 4/2006 | Pickard |

FOREIGN PATENT DOCUMENTS

EP 0769659 4/1997

*Primary Examiner* — Theresa Walberg

(74) *Attorney, Agent, or Firm* — Holland & Bonzagni, P.C.; Mary R. Bonzagni, Esq.

(57) ABSTRACT

A radiant heating assembly for use with systems for heating an enclosed space by circulating a fluid through a closed tubing arrangement is provided. The inventive radiant heating assembly is made up of a radiant heating panel and tubing. The radiant heating panel is made up of a radiant heat transfer plate having a length and center line, and an elongated C-shaped or side opening receptacle that extends along the center line of the plate for receiving the tubing. A plurality of depressions extends along an inner surface of the C-shaped receptacle that interfaces with the plate. The tubing conforms to these depressions, thereby allowing the radiant heating assembly to achieve greater radiant heat dissipation capacity and efficiency.

18 Claims, 1 Drawing Sheet

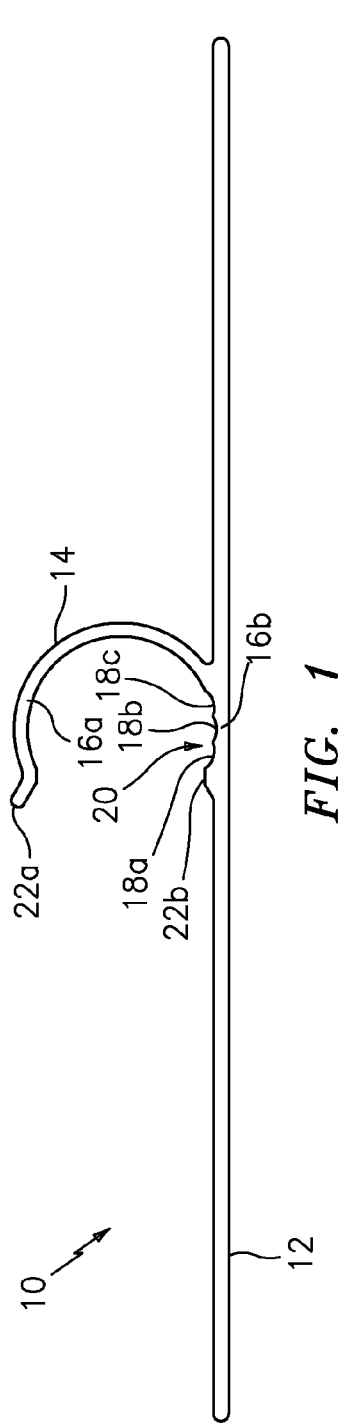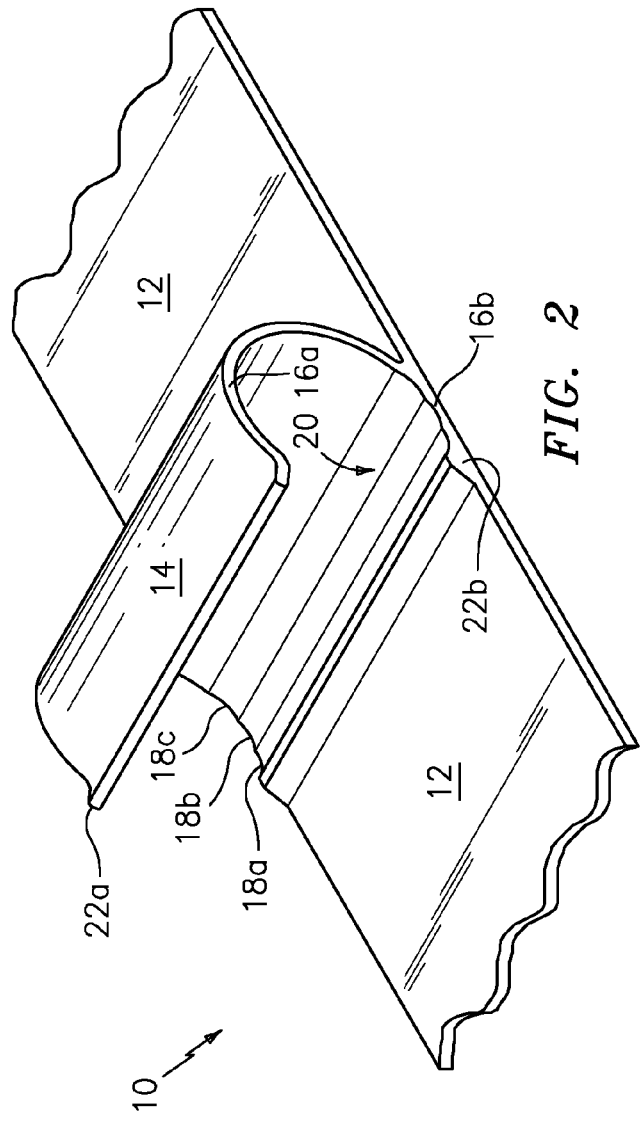

RADIANT HEATING ASSEMBLY

RELATED APPLICATION

This application is a continuation-in-part of U.S. patent application Ser. No. 11/291,708, filed Dec. 1, 2005, which claims priority to U.S. Provisional Patent Application Ser. No. 60/687,701, filed Jun. 6, 2005, both of which are fully incorporated herein by reference.

TECHNICAL FIELD OF THE INVENTION

The present invention generally relates to a radiant heating assembly, and more particularly relates to a radiant heating assembly for use with systems for heating an enclosed space by circulating a fluid through a closed tubing arrangement. The inventive assembly demonstrates greater radiant heat dissipation and facilitates tubing installation, while minimizing the danger of tubing popping out or disengaging from the assembly after installation.

BACKGROUND OF THE INVENTION

Radiant floor heating has been used for hundreds of years. The Romans were known to channel hot air under the floors of their villas, while the Koreans were known to channel hot flue gases under their floors before venting them up the chimney. In the 1930s, Frank Lloyd Wright designed many of his buildings with radiant floor heating.

There are three basic types of radiant floor heat, namely, radiant air floors where air is the heat carrying medium, electric radiant floors, and hydronic (liquid or hot water) radiant floors. All three types can be further subdivided by the type of installation: "wet" installations—those that make use of the large thermal mass of a concrete slab floor or lightweight concrete over a wooden subfloor, and "dry" installations—those in which the installer inserts the radiant floor tubing between two layers of plywood or attaches the tubing under the finished or subfloor.

Hydronic (liquid or hot water) radiant floor systems, which have been deemed the most popular and cost-effective systems for heating-dominated climates, pump heated liquid or water from a boiler through tubing laid in a pattern underneath the floor. The temperature in each room is controlled by regulating the flow of hot liquid or water through each tubing loop. This is done by a system of zoning valves or pumps and thermostats.

In terms of installation, dry floor installations have been gaining popularity over wet floor installations. This is due in part to the fact that dry floors are faster and less expensive to build.

As alluded to above, dry radiant floors may be prepared or fabricated by installing the tubing from above the floor, between two layers of subfloor. In these instances, the tubes are often in aluminum diffusers that spread the liquid or waters heat across the floor in order to heat the floor more evenly. The tubing and heat diffusers may be secured between furring strips (sleepers) which carry the weight of the new subfloor and finished floor surface.

Several companies have attempted to improve upon the heat diffusers used in dry installations. For example, U.S. Pat. No. 5,454,428 to Pickard et al. (the '428 patent) discloses an extruded aluminum radiant heat transfer plate having heat transfer side edges or fins and an elongated receptacle running the length of the extrusion for receiving and holding/confining plastic tubing. The elongated receptacle can take the form of a "C" that stands above the plane of the heat transfer fins, or the form of a "U", the legs of which integrally connect to the fins.

As referenced in Cols. 1 to 2, lines 63 to 4, of the '428 patent, in either of the above-referenced configurations, the tubing-receiving channel is semicircular with the degree of wrap being on the order of 200°. The sides of the receptacle that lead into the channel are planar and acutely-sloped from the vertical at about 30°. The sloped sides of the receptacle serve as a guideway facilitating the positioning and insertion of the tubing into the channel.

The inner diameter of the tubing-receiving channel closely approximates the outer diameter of the plastic tubing. Moreover, the tubing-receiving channel is extruded to a thickness that prevents it from readily deforming. As such, the plastic tubing is reportedly deformed during insertion and held tightly within the receiving channel permitting heat transfer essentially by conduction.

The side fins are relatively thin-walled (e.g., 0.078 to 0.015 inches), while the thickness of the walls of the tubing receptacle are relatively thick (e.g., at least 0.060 inches). See Col. 3, lines 44 to 50, and Col. 5, lines 9 to 13, of the '428 patent.

The principal mode of heat transfer between the tubing and the channel wall in the '428 patent is one of conductance and not convection. See Col. 5, lines 44 to 47, of the '428 patent. This reference teaches that heat transfer by way of convection will result in deterioration of the heat transfer characteristics of the system. See Col. 5, lines 26 to 31, of the '428 patent.

U.S. Pat. No. 5,743,330 (the '330 patent) discloses panels for supporting heat transfer tubing that are touted as improvements over the hydronic radiant heat distribution panel and system of the '428 patent. The inventive panels basically comprise a track for receiving tubing carrying heat transfer fluid, which has an inner surface that is multi-faceted. The term "multi-faceted" is defined at Col. 3, lines 21 to 24, of the '330 patent as being "composed of a series of discontinuous, discrete, substantially straight faces 90 that are angled with respect to one another (FIGS. 1A and 2A)."

The segmented faces 90 of the multi-faceted, inner surface reportedly serve to securely grip the heat transfer tubing 17, thereby minimizing danger of the tubing 17 popping out or disengaging from the track 2 after installation, while providing for both convective and conductive heat transfer between the tubing 17 and receiving panel 1.

U.S. Patent Appl. Serial No. US 2005/0028966 A1 (the '966 patent application) discloses an improved heat distribution panel which utilizes an extruded tubing receptacle having a tube receiving channel for tightly gripping heat tubing throughout both straight and curved or looped runs. The tubing receptacle has a generally square or rectangular peripheral outline, which includes flat side wall and flat bottom surfaces. Heat tubing is received and retained by a snap-fit in the tube receiving channel of the tubing receptacle for heat transfer directly to the tubing receptacle essentially by conduction rather than convection. See page 1, paragraph [0008], of the '966 patent application. The channel portion of the receptacle may be constructed in accordance with the teachings of U.S. Pat. No. 5,454,428. See page 3, paragraph [0026], of the '966 patent application. Sheet metal heat transfer plates may be held against or permanently attached to the essentially planar outside surfaces of the tubing receptacle.

Unfortunately, tubing installed with the heat transfer plates or panels described above, which all employ top opening tubing receptacles for holding/confining plastic tubing, have been known to pop out or disengage from the receptacle after installation due to expansion and contraction of the tubing as liquid or water flowing there through changes temperature.

Gravitational forces and/or vibrational stress encountered by the panels during system operation further promote this tendency of the tubing to disengage.

It is therefore a stated object of the present invention to address this deficiency and, in a preferred embodiment, to improve upon the radiant heat dissipation and cooling capacity and efficiency demonstrated by prior art radiant panels.

SUMMARY

The present invention therefore provides a radiant heating or cooling panel that basically comprises: a radiant heat transfer or cooling plate having a length; and an elongated C-shaped or side opening receptacle for receiving tubing (e.g., plastic tubing), where the elongated C-shaped receptacle extends along the length of the radiant heat transfer or cooling plate and is formed from upper and lower arcuate or angled sections, and where the lower arcuate or angled section of the C-shaped receptacle is fixably attached to the plate along the length of the plate.

In one contemplated embodiment, a plurality of depressions extend along an inner surface of the elongated tubing receptacle, preferably extending along that portion of the inner surface of the tubing receptacle that interfaces (i.e., forms a common boundary) with the radiant heat transfer or cooling plate.

In a more preferred embodiment, the plurality of depressions take the form of either discontinuous depressions or continuous depressions that each extend along the entire length of the inner surface of the lower arcuate or angled section of the C-shaped receptacle, where each continuous depression is contiguous to at least one other continuous depression.

The present invention further provides a radiant heating assembly, which comprises a radiant heating panel and tubing, wherein the radiant heating panel is made up of (a) a radiant heat transfer plate having a length and a center line that extends along the length, and (b) an elongated C-shaped receptacle for receiving the tubing, wherein the C-shaped receptacle extends along the center line of the radiant heat transfer plate and is formed from upper and lower arcuate or angled sections, with at least the upper section terminating in an edge, wherein a plurality of depressions extend along an inner surface of the C-shaped receptacle that interfaces with the plate, the lower section of the C-shaped receptacle fixably attached to the plate along the center line of the plate, wherein the tubing is contained within the C-shaped receptacle and conforms to the plurality of depressions.

In one contemplated embodiment, the plurality of depressions take the form of a plurality of adjacent or contiguous depressions that extend across the entire width and along a length of the inner surface of the C-shaped receptacle that interfaces with the plate.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings in which:

FIG. 1 is a cross-sectional side view of a preferred embodiment of the radiant heating or cooling panel of the present invention; and FIG. 2 is a partially sectioned perspective view of the inventive radiant heating or cooling panel shown in FIG. 1.

BEST MODE FOR CARRYING OUT THE INVENTION

Although the present inventive radiant heating assembly is described herein mainly in conjunction with radiant floor heating systems, it is not so limited. The inventive assembly may be used with any system for heating an enclosed space by circulating a fluid through a closed tubing arrangement. More specifically, the inventive assembly may be used in a radiant heating system where a thermal medium is circulated that transmits heat to the radiant heating panels.

The C-shaped or side-opening tubing receptacle of the panel used in the inventive assembly facilitates tubing installation, making it easier for an installer to insert tubing along the length of the panel while minimizing the danger of the tubing popping out or disengaging from the receptacle after installation due to expansion and contraction of the tubing as liquid or water flowing there through changes temperature. Gravitational forces and/or vibrational stress encountered by the panels during system operation further promote this tendency of the tubing to disengage.

In addition to that noted above, heat transfer is increased by providing a plurality of depressions in that portion of the inner surface of the tubing receptacle that interfaces with the radiant heat transfer plate. The depressions serve to increase the surface area for heat transfer to the radiant heat transfer plate, thereby providing the inventive panel with greater heat dissipation capacity and efficiency.

Referring now to the drawings in detail, a preferred embodiment of the radiant heating panel of the radiant heating assembly of the present invention is shown and generally designated by reference numeral 10.

As best shown in FIG. 1, the preferred embodiment of the radiant heating panel 10 basically comprises: a radiant heat transfer plate 12 having a length; and an elongated C-shaped or side opening receptacle 14 having upper and lower arcuate or angled sections 16a, 16b, that extends along the length of the radiant heat transfer plate 12 for receiving tubing (e.g., plastic tubing), wherein a plurality of depressions 18a, 18b, 18c, extend along a portion 20 of an inner surface of the lower section 16b of the elongated tubing receptacle 14 that interfaces (i.e., forms a common boundary) with plate 12.

The radiant heat transfer plate 12 is a planar structure that serves to transfer heat to (or from) surrounding areas and preferably comprises mounting means such as pre-punched mounting holes. While the size and shape of plate 12 is not limited, it is preferred that plate 12 adopt a rectangular configuration. It is further preferred that the length of plate 12 range from about 0.9 to about 1.5 meters (m) (more preferably, from about 1.1 to about 1.3 m), that the width of plate 12 range from about 5.1 to about 15.2 centimeters (cm) (more preferably, from about 7.6 to about 12.7 cm) and that the thickness of plate 12 range from about 0.25 to about 1.78 millimeters (mm)(more preferably, from about 0.51 to about 1.52 mm).

As noted above, the elongated C-shaped or side opening receptacle 14 has upper and lower arcuate or angled sections 16a, 16b, and extends along the length of plate 12. A plurality of depressions 18 extend along an inner surface of the lower section 16b of the elongated tubing receptacle 14, preferably located on portion 20 of the inner surface that interfaces with plate 12.

The channel defined by tubing receptacle 14 is preferably semicircular in cross-section, having a diameter that closely approximates the outer diameter of the tubing (as specified in, for example, ASTM F-876). Receptacle 14 has a preferred thickness that ranges from about 0.25 to about 1.78 mm, more preferably, from about 0.51 to about 1.52 mm. The channel defined by tubing receptacle 14 may also adopt a square or rectangular cross-sectional shape. In yet a more preferred embodiment, the thickness of receptacle 14 is less than about 5/100 inch (1.27 mm) (most preferably, about 4/100 inch (1.02 mm)). The degree of wrap of tubing receptacle 14 is greater than about 190° (preferably, from about 220° to about 260°).

Depressions 18 may take the form of discontinuous depressions (i.e., depressions that do not each extend along the entire length of the inner surface of tubing receptacle 14), or continuous, adjacent or contiguous depressions (i.e., depressions that extend along the entire length of the inner surface of tubing receptacle 14 and that are contiguous to (or touch) at least one other continuous depression). The size and shape of the depressions 18 are not limited. In a preferred embodiment, depressions 18 are contiguous U-shaped depressions or valleys that extend along the entire length of the tubing receptacle 14, and that each have a width ranging from about 0.13 to about 0.38 mm (preferably, from about 0.18 to about 0.33 mm), and a depth ranging from about 0.25 to about 0.76 mm (preferably, from about 0.38 to about 0.64 mm).

In the preferred embodiment of panel 10 shown in FIGS. 1 and 2, tubing receptacle 14 is provided with flared edges 22a, 22b, and contiguous, U-shaped depressions or valleys 18a, 18b, 18c formed in a portion 20 of the inner surface of the lower section 16b of tubing receptacle 14, that extend along the entire length of receptacle 14.

Plate 12 and flared edges 22a, 22b, each aid in the positioning of tubing prior to insertion into tubing receptacle 14. Moreover, upon insertion of the tubing into receptacle 14, the side opening in receptacle 14 aids in preventing the tubing from disengaging from receptacle 14 due to, for example, gravitational forces and/or vibrational stress.

As noted above, the inventive panel 10 may be used in a radiant heating system or in a cooling system where a thermal medium (e.g., water, air) is circulated that transmits heat to the radiant heat transfer plate or that receives heat from the cooling plate.

Heat transfer within the radiant heating assembly of the present invention, which comprises the radiant panel 10 and tubing, takes place by conductance (between the tubing and inner surface of the tubing receptacle). The depressions increase the inner surface area of the tubing receptacle thereby effecting an increase in overall heat transfer, when compared to a tubing receptacle having a smooth inner surface.

The radiant panel 10 of the present invention is preferably constructed from a thermally conductive material such as copper or aluminum, and is more preferably constructed from aluminum. In yet a more preferred embodiment, radiant panel 10 is a unitary or one-piece, extruded aluminum panel that is prepared by co-extruding plate 12 and tubing receptacle 14 using conventional extrusion methods and techniques.

Generally speaking, the radiant panel 10 of the present invention may be installed by surface mounting or embedding on/in floors, walls, or ceilings, and is suitable for use in both wet and dry installations. Installation of the inventive panels 10 together with tubing is a straightforward process, which begins with arriving at a workable design for the radiant heating or cooling installation. As will be readily appreciated by those skilled in the art, the design of any such installation is driven by required heating or cooling and performance requirements. For radiant heating installations, heatloss and heat requirements for the target area would be calculated; the required temperatures of the thermal medium (e.g., water, air) and floor, wall, or ceiling surfaces would then be determined along with the size and number of panels 10, length of tubing, and preferred panel layout. Installation of panels 10 would then proceed by securing the panels 10 to target surfaces by hammering or otherwise securing appropriate fasteners such as nails, screws, or construction staples into place through, for example, pre-punched mounting holes. A small gap between the ends of adjacent panels 10 in the lengthwise direction would be provided to allow for expansion and contraction of the panels 10. Once the panels are secured in place, the tubing would be installed within tubing receptacles 14. The tubing would be snapped into place, optionally with the aid of, for example, a rubber mallet. No additional fasteners or supports are needed.

The tubing used in the radiant heating assembly of the present invention has preferred outer diameters ranging from about ½ inch (12.7 mm) to about ⅝ inch (15.9 mm) and preferred inner diameters ranging from about ⅜ inch (9.5 mm) to about ½ inch (12.7 mm). Preferred minimum tubing wall thicknesses range from about 7/100 inch (1.8 mm)+/−1/100 inch (0.25 mm).

A preferred material for use in making the tubing is raised temperature resistant polyethylene (PE-RT), which is available from The Dow Chemical Company, Midland, Mich., under the product designation DOWLEX 2344 PE Resin.

When the temperature of the thermal medium (e.g., water, air) circulating through the PE-RT tubing reaches temperatures of at least about 35° C., the tubing softens and expands into depressions 18 of tubing receptacle 14. Tubing prepared using PE-RT is much more pliable and formable than cross-linked polyethylene (PEX), which allows the tubing to conform to the depressions of the receptacle, thereby increasing its heat transfer characteristics.

Although the present invention has been shown and described with respect to detailed embodiments thereof, it will be understood by those skilled in the art that various changes in form and detail thereof may be made without departing from the spirit and scope of the claimed invention.

Having thus described the invention, what is claimed is:

1. A radiant heating assembly, which comprises a radiant heating panel and tubing, wherein the radiant heating panel is made up of (a) a radiant heat transfer plate having a length and a center line that extends along the length, (b) mounting holes provided in the plate, and (c) an elongated C-shaped receptacle for receiving the tubing, wherein the C-shaped receptacle extends along the center line of the radiant heat transfer plate and is formed from upper and lower arcuate or angled sections, with at least the upper section terminating in an edge, wherein a plurality of depressions extend along an inner surface of the C-shaped receptacle that interfaces with the plate, the lower section of the C-shaped receptacle fixably attached to the plate along the center line of the plate, wherein the radiant heat transfer plate is completely planar except for areas containing mounting holes and the C-shaped receptacle, wherein the tubing is contained within the C-shaped receptacle and deforms to be in contact with inner surfaces of the plurality of depressions.

2. The radiant heating assembly of claim 1, wherein the radiant heating panel is constructed from a thermally conductive material.

3. The radiant heating assembly of claim 2, wherein the radiant heating panel is constructed from aluminum.

4. The radiant heating assembly of claim 3, wherein the radiant heating panel is an extruded, one-piece aluminum panel.

5. The radiant heating assembly of claim 1, wherein the plurality of depressions comprise two or more discontinuous depressions.

6. The radiant heating assembly of claim 1, wherein the plurality of depressions comprise two or more continuous depressions that each extend along the entire length of the inner surface of the lower section of the C-shaped receptacle, wherein each continuous depression is contiguous to at least one other continuous depression.

7. The radiant heating assembly of claim 6, wherein each depression is a U-shaped depression.

8. The radiant heating assembly of claim 7, wherein each U-shaped depression has a width ranging from about 0.13 to about 0.38 millimeters, and a depth ranging from about 0.25 to about 0.76 millimeters.

9. The radiant heating assembly of claim 1, wherein the plurality of depressions comprise two or more adjacent or contiguous depressions that extend across the entire width and along a length of the inner surface of the C-shaped receptacle that interfaces with the plate.

10. The radiant heating assembly of claim 1, wherein both the upper and lower sections of the elongated, C-shaped receptacle terminate in an outwardly flaring edge.

11. The radiant heating assembly of claim 1, wherein the C-shaped receptacle has a thickness of less than about 1.27 millimeters.

12. The radiant heating assembly of claim 11, wherein the thickness of the C-shaped receptacle is about 1.02 millimeters.

13. The radiant heating assembly of claim 1, wherein the tubing is prepared from raised temperature resistant polyethylene.

14. A radiant heating assembly, which comprises a radiant heating panel and tubing, wherein the radiant heating panel is made up of (a) a radiant heat transfer plate having a length and a center line that extends along the length, and (b) an elongated C-shaped receptacle for receiving the tubing, wherein the C-shaped receptacle extends along the center line of the radiant heat transfer plate and is formed from upper and lower arcuate or angled sections, with at least the upper section terminating in an edge, wherein a plurality of depressions extend along an inner surface of the C-shaped receptacle that interfaces with the plate, the lower section of the C-shaped receptacle fixably attached to the plate along the center line of the plate, wherein the tubing is contained within the C-shaped receptacle and deforms to be in contact with inner surfaces of the plurality of depressions.

15. The radiant heating assembly of claim 14, wherein the plurality of depressions comprise two or more adjacent or contiguous depressions that extend across the entire width and along a length of the inner surface of the C-shaped receptacle that interfaces with the plate.

16. The radiant heating assembly of claim 14, wherein the C-shaped receptacle has a thickness of less than about 1.27 millimeters.

17. The radiant heating assembly of claim 16, wherein the thickness of the C-shaped receptacle is about 1.02 millimeters.

18. The radiant heating assembly of claim 14, wherein the tubing is prepared from raised temperature resistant polyethylene.

* * * * *